US007953647B2

(12) United States Patent
Bolivar et al.

(10) Patent No.: US 7,953,647 B2
(45) Date of Patent: May 31, 2011

(54) SYSTEM AND METHOD FOR VERIFYING BIDDING PRICE

(75) Inventors: Alvaro Bolivar, San Francisco, CA (US); Wenyan Hu, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/503,745

(22) Filed: Jul. 15, 2009

(65) Prior Publication Data

US 2011/0016015 A1    Jan. 20, 2011

(51) Int. Cl.
 *G06Q 30/00*    (2006.01)
(52) U.S. Cl. ............... 705/26.35; 705/26.1; 705/27.1
(58) Field of Classification Search .............. 705/26, 705/27
See application file for complete search history.

(56) References Cited

U.S. PATENT DOCUMENTS

| | | | |
|---|---|---|---|
| 5,047,959 A | 9/1991 | Phillips et al. | |
| 5,794,219 A | 8/1998 | Brown | |
| 6,230,146 B1 * | 5/2001 | Alaia et al. | 705/37 |
| 7,401,047 B2 * | 7/2008 | Yokoo et al. | 705/37 |
| 7,523,016 B1 * | 4/2009 | Surdulescu et al. | 702/185 |
| 7,527,195 B2 * | 5/2009 | Keithley et al. | 235/380 |
| 7,642,924 B2 * | 1/2010 | Andres et al. | 340/628 |
| 2003/0088504 A1 | 5/2003 | Fisher et al. | |
| 2005/0165650 A1 * | 7/2005 | Kothapalli et al. | 705/26 |
| 2005/0289043 A1 * | 12/2005 | Maudlin | 705/37 |
| 2006/0271471 A1 * | 11/2006 | Alaia et al. | 705/37 |
| 2007/0129999 A1 * | 6/2007 | Zhou et al. | 705/14 |
| 2008/0211678 A1 * | 9/2008 | Andres et al. | 340/603 |

OTHER PUBLICATIONS

Active Network Approach to Design of Secure Online Auction Systems, Shihada, B., Mar. 2001, Dalhousie University, Halifax, Nova Scotia.*

* cited by examiner

*Primary Examiner* — Jason B Dunham
*Assistant Examiner* — Ethan Civan
(74) *Attorney, Agent, or Firm* — Schwegman, Lundberg & Woessner, P.A.

(57) ABSTRACT

Potential bidding errors may be detected using a computer-implemented method comprising receiving a proposed bid for an auction item, the auction item having a current bid and a minimum bid increment, the proposed bid being greater than the sum of the current bid and the minimum bid increment. The method then determines a threshold value, the threshold value being greater than the sum of the current bid and a minimum bid increment. When the proposed bid is greater than the threshold value, then the method validates the proposed bid using the current bid and the proposed bid to provide a validation result. Additional apparatus, systems, and methods are disclosed.

17 Claims, 8 Drawing Sheets

SYSTEM AND METHOD FOR VERIFYING BIDDING PRICE

TECHNICAL FIELD

Various embodiments described herein relate generally to computer systems, and more particularly, but not by way of limitation, to systems and methods for conducting online auctions.

BACKGROUND

Wide-area networks, including world-wide networks, such as the Internet, have become useful tools for personal and business use. The most ubiquitous network, the Internet, began as a system to provide general communication and has grown into a medium that supports world-wide broadcasting, information dissemination, collaboration, and commerce between people and businesses. In the modern version of the Internet, people may use it to conduct personal, financial, legal, and other business. Using systems connected to the Internet, people may engage in all kinds of online commerce. For example, the Internet has enabled consumers to purchase goods using online stores and auctions. Using computer systems, and the Internet, to purchase goods carries challenges that are unique to that environment.

One significant challenge is validation of user input. In an online auction setting, validating a user identity, auction listing information, and bidding information is essential to provide a reliable and secure auction platform. However, due to the nature of electronic auction systems, some data entry errors may be harder to detect because of the lack of an intelligent systems. Thus, there is a need in online auction systems for mechanisms to detect data errors and reduce or minimize the occurrence of using or accepting invalid data input.

BRIEF DESCRIPTION OF THE DRAWINGS

Some embodiments are illustrated by way of example, and not limitation, in the figures of the accompanying drawings in which.

DETAILED DESCRIPTION

Figure 1:
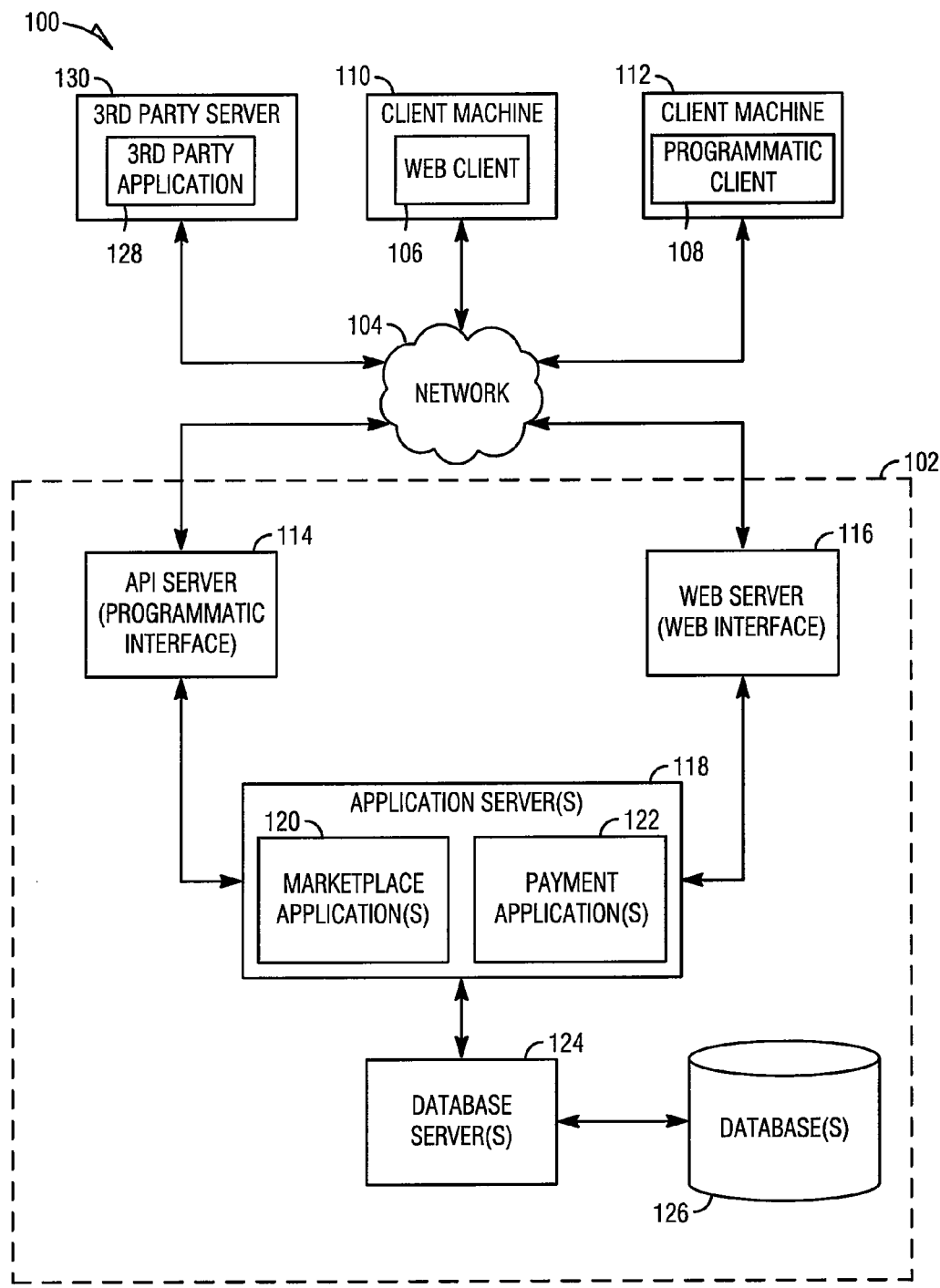
FIG. 1 is a schematic diagram illustrating a network system having a client-server architecture, according to an example embodiment.

The following detailed description includes references to the accompanying drawings, which form a part of the detailed description. Example methods, apparatus, and systems to reduce user errors, including data entry errors in bidding, are described. In the following description, for purposes of explanation, numerous specific details are set forth in order to provide a thorough understanding of example embodiments. These various embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

While the apparatus, systems, and methods described herein are directed to maintaining the data integrity in bidding in an online auction, these mechanisms may be applied to any number of transactional systems in online markets where an input value representing money should be verified to ensure valid input and data integrity.

Auctions may be fast-paced, stressful environments where bidders are prone to make errors. Mechanisms to detect and isolate bids that are likely incorrect are useful and consequently, a valuable addition to an online auction system, as well as having a useful and practical application in other transactional environments.

In addition, online auctions may provide an environment that invites attempts to defraud or game the auction to gain an unfair advantage. For example, a malevolent bidder may enter a bid that is grossly out of proportion to a current bid or the amount that others are likely to bid. As a result, this may have the effect of putting the malicious bidder as the current high bidder, with a bid incrementally above the previous high bidder's maximum bid; thus revealing the previous high bidder's maximum bid. The malevolent bidder may then request that the auction site retract their bid, for example by claiming that the bid was entered in error. If given the requested retraction, the current high bid is reset to the previous amount and the malicious bidder has additional knowledge of the auction, which may be used to defraud or "game" the system.

Bids that result in bid retractions reduce confidence in the integrity of an auction system. To counteract such problems, in example embodiments described herein, various statistical modeling and data interpretation techniques are used to detect suspicious bids. Suspicious bids may be the result of malformed, malicious, or erroneous bid entries. Once detected, the suspicious bid value may be presented to a user, who may confirm the bid value as being valid. Once confirmed, the bid may be considered un-retractable. That is, after user confirmation the bid is considered binding such that the bid may no longer be retracted; this may result in fewer attempts to defraud the system. The user may be provided with the opportunity to revise the bid amount, instead of retracting the bid, after which a similar validity check may be performed on the revised amount.

Figure 11:
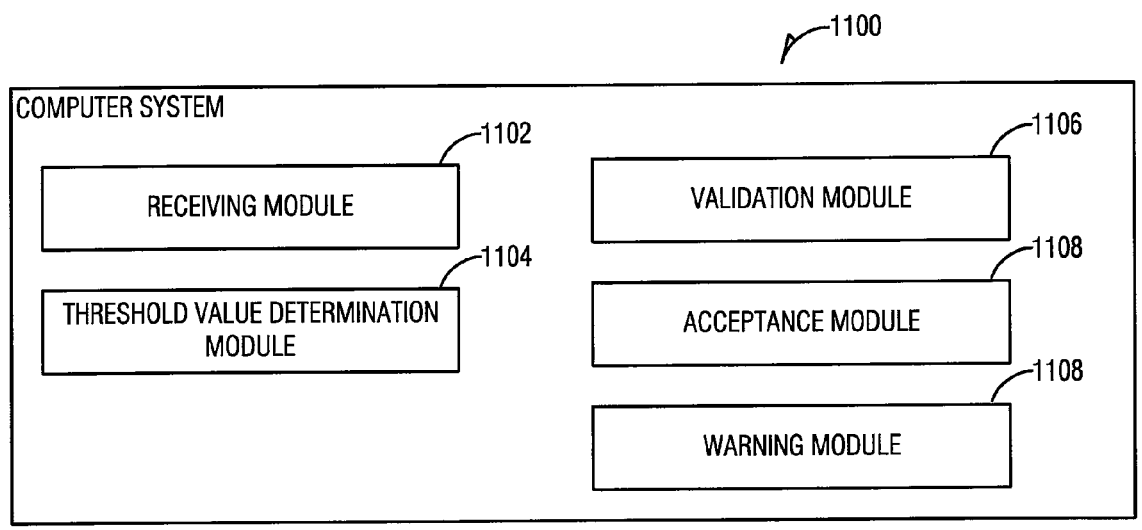
FIG. 11 is a block diagram illustrating a computer system, according to an example embodiment.
Figure 12:
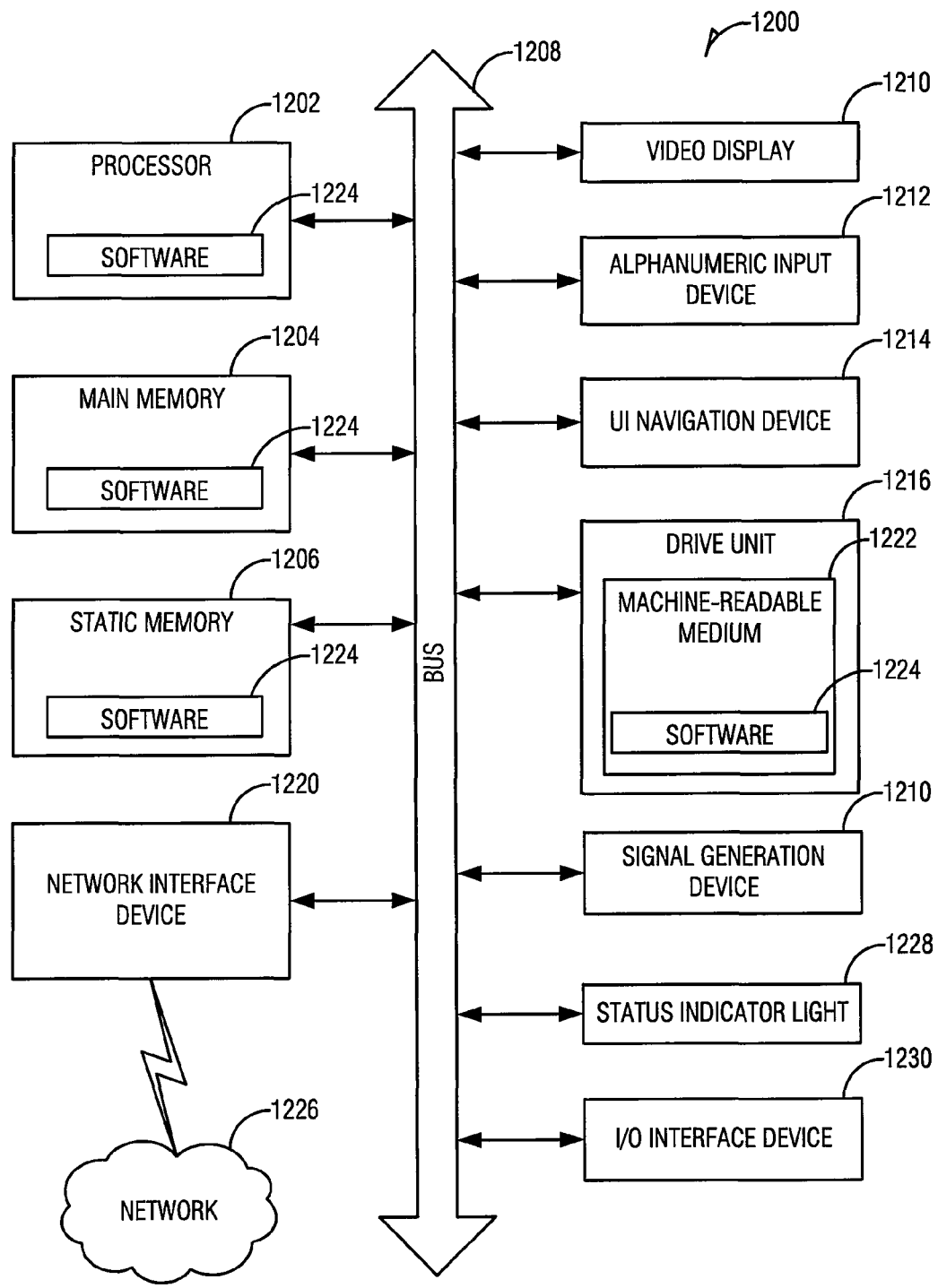
FIG. 12 is a block diagram illustrating a machine in the example form of a computer system, within which a set or sequence of instructions for causing the machine to perform any one of the methodologies discussed herein may be executed, according to various embodiments.

The following sections include a description of a platform for verifying bid values in online auctions (FIG. 1), marketplace and payment applications (FIG. 2), flowcharts of methods for verifying bid values (FIGS. 3-10), a block diagram of a system for verifying bid values (FIG. 11), and a machine diagram (FIG. 12).

Platform Architecture

FIG. 1 is a schematic diagram illustrating a network system having a client-server architecture, according to an example embodiment. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces, respectively, to one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

The present subject matter falls into the category of data integrity applications 234 (discussed below in description of FIG. 2). These applications may be housed on the application server(s) 118 and may be considered marketplace applications 120. In various embodiments, the data integrity applications 234 have different degrees of interaction with the database servers 124. In an embodiment, bid histories are accessed from the database servers 124 to determine a threshold value. Using such information, the data integrity applications 234 may detect possible erroneous data entries and provide an alert to a user for correction or confirmation.

Marketplace Applications

Figure 2:
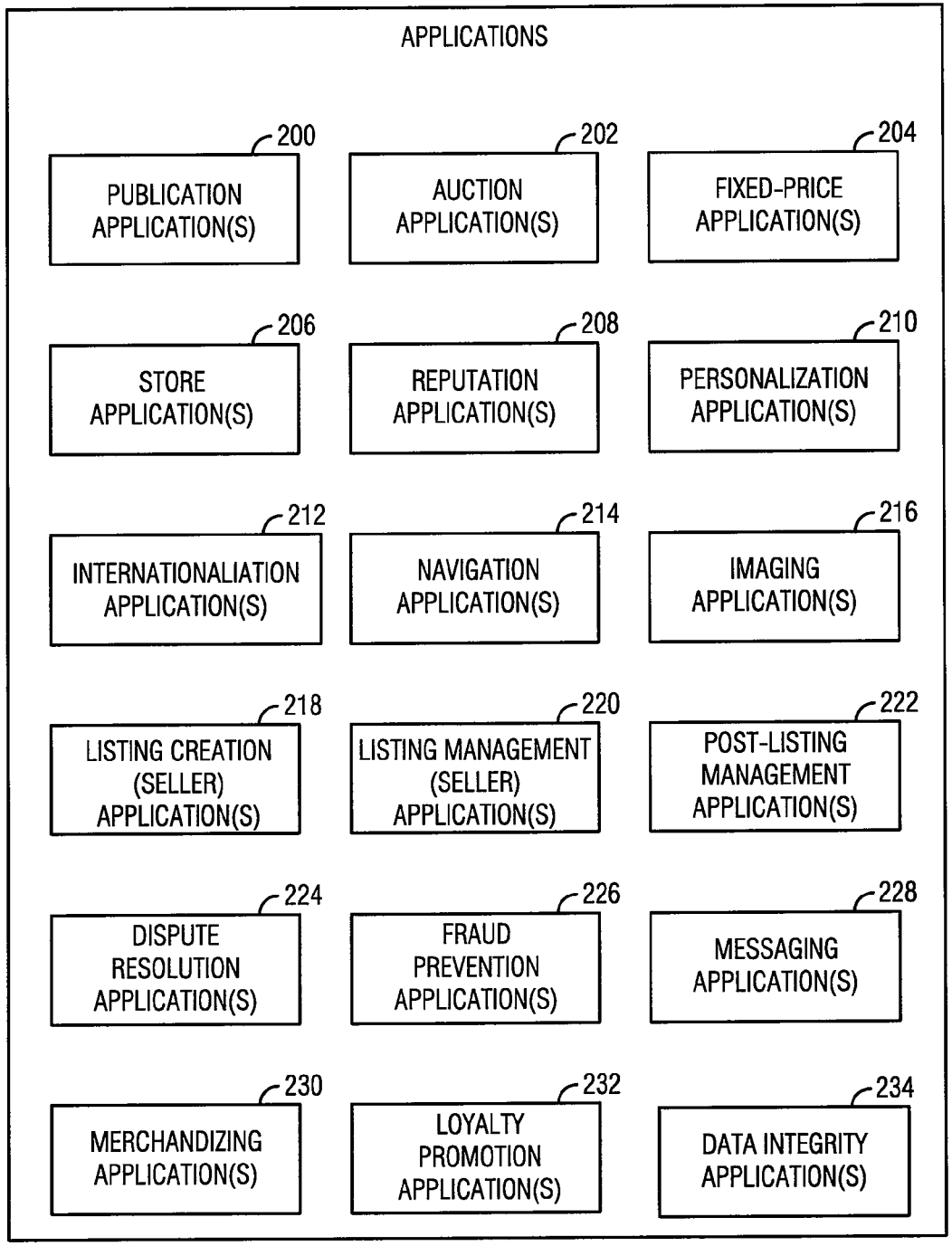
FIG. 2 is a block diagram illustrating multiple marketplace applications that, in an example embodiment, are provided as part of a network-based marketplace.

FIG. 2 is a block diagram illustrating multiple marketplace applications that, in an example embodiment, are provided as part of a network-based marketplace. FIG. 2 includes multiple applications 120 and 122 that, in one example embodiment, are provided as part of the networked system 102. The applications 120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 124.

The networked system 102 may provide a number of publishing, listing and price-setting mechanisms whereby a seller may list (or publish information concerning) goods or services for sale, a buyer may express interest in or indicate a desire to purchase such goods or services, and a price may be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user, for example through feedback provided by other transaction partners, to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings visually informing and attractive, the marketplace applications 120 may include one or more imaging applications 216 with which users may upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102. The listing management applications 220 then allow sellers to manage such listings. Specifically, where a particular seller has authored and/or published a large number of listings, the management of such listings may present a challenge. The listing management applications 220 provide a number of features (e.g., auto-re-listing, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208 so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such messages for example advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotions points for each transaction established and/or concluded with a particular seller and may be offered a reward for which accumulated loyalty points may be redeemed.

Data integrity applications 234 support various functions that serve to prevent users in the networked system 102 from incorrectly entering information. The data integrity applications 234 also may interact with the fraud prevention applications 226 to maintain the integrity of the auctions by preventing fraud perpetrated on the basis of typographical mistake when bidding.

A summary of examples of how the data integrity applications 234 may interact with the fraud prevention applications 226 includes warning that the bid amount entered may be erroneous, asking the user to confirm the bid, and if the bid is confirmed refusing to allow bid retractions on grounds of a typographical error. The data integrity applications 234 in this example may receive the proposed bid, determine a threshold value, and compare the proposed bid to the threshold value. If the bid exceeds the threshold value, then the data integrity applications may validate the bid to ensure that the bid is acceptable. If the validation of the proposed bid fails, the data integrity applications 234 may generate an error. In some embodiments the user may be given the option to confirm that there bid was entered correctly. If the user confirms the bid, the bid is accepted. From that point on, the fraud prevention applications 226 may deny the user the ability to retract the bid based on the rationale that the user was previously warned.

Systems and Methods

Figure 3:
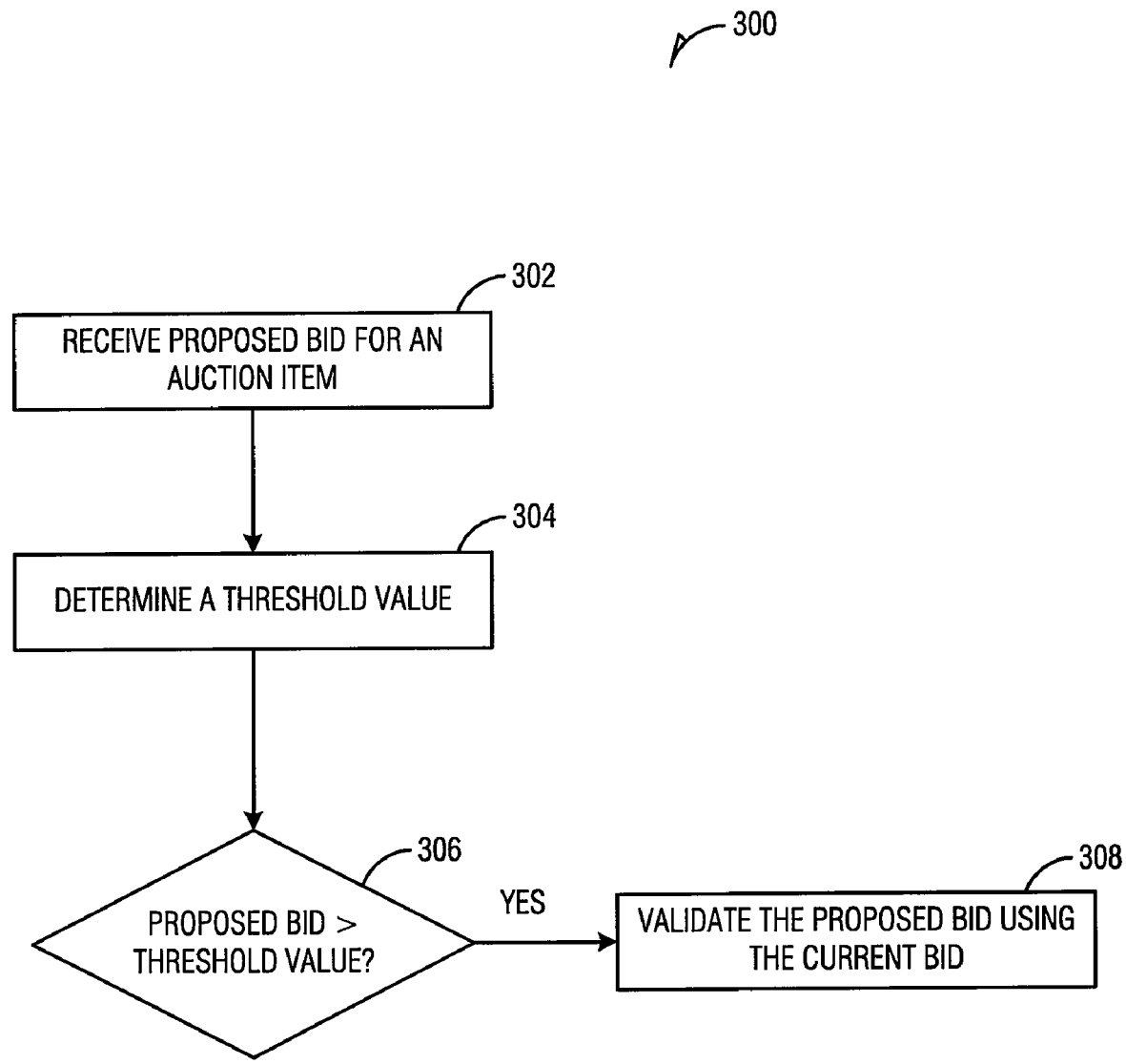
FIG. 3 is a flowchart illustrating a method for checking the validity of an auction bid, according to an example embodiment.

FIG. 3 is a flowchart illustrating a method 300 for checking the validity of an auction bid, according to an example embodiment. At 302, a proposed bid for an auction item is received, the auction item having a current bid and a minimum bid increment, the proposed bid being greater than the sum of the current bid and the minimum bid increment. A minimum bid increment is the minimum additional amount that must be bid over the current bid value for a bid to be considered.

At 304, a threshold value is determined. A threshold value, as used in this application, is a variable that represents a value, for which proposed bids under the value represent immediately valid bids and proposed bids over the value represent bids that are further considered before being deemed valid. A suspicious bid may be the result of a misplaced decimal point, which could cause the proposed bid to be 10, 100, or even 1000 times the value that the bidder was intending to bid. A disproportionately high bid may also be an attempt to defraud the auction system or the seller. In such a case, the suspicious bid may not be erroneous, but rather malicious. Although a suspicious bid may be potentially erroneous, it has not been established that it actually is erroneous. However, based on the size or amount of the bid, it is suspected of being an error or an act of mischief or malice.

In an embodiment, the threshold value is greater than the sum of the current bid and a minimum bid increment. The threshold value may be determined in several ways.

In an embodiment, the threshold value is a static or constant value. For example, the threshold value may be set by a system administrator or other administrative user to $5.00. In such an embodiment, when the current bid exceeds $5.00, every proposed bid that exceeds the current bid of $5.00 is then evaluated for validity (e.g., see block 306 of FIG. 3). A constant threshold value may be used within a portion of the auction system, such as within a category, product line or storefront, for example. As such, products, product lines, product categories, or storefronts may be stratified to provide higher threshold values for portions of the auction system that typically deal with more expensive items and lower threshold values for portions of the auction system that deal with less expensive products. In addition, a constant threshold value may be assigned to a particular user of the auction system. In this manner, users who have earned a higher stature in the online system (e.g., through a reputation) may be assigned a higher threshold value than those who are less reliable or trustworthy. Other mechanisms may be used to determine a threshold value, as described in FIGS. 4-6.

Figure 4:
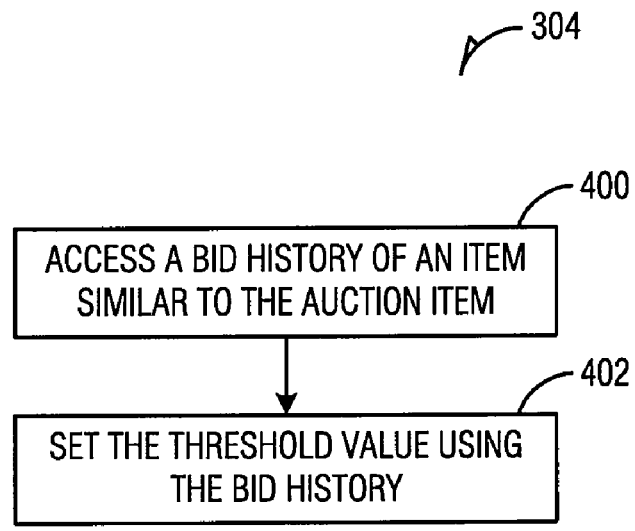
FIG. 4 is a flowchart illustrating a method of determining a threshold value, according to an example embodiment.

Referring now to FIG. 4, is the figure depicts a flow chart illustrating a method 304 of determining a threshold value, according to an example embodiment. At 400, a bid history of an item similar to the auction item is accessed. The bid history may include a certain period of data, such as a year's worth, a month's worth, or a week's worth of data. The similarity of items considered during this operation may be set with varying degrees of control. For example, in an auction for a can of tennis balls, similar items may be considered at a fine-tuned level, such as "new Penn® hard court tennis balls, color green" or at a more generic level, such as "package of three tennis balls." Various statistical and mathematical modeling may be used to obtain bid histories with sufficient sample sizes of non-trivial data. In addition, correlation techniques may be used to fine-tune the threshold value for a particular auction item.

At 402, the threshold value is set using the bid history. In an embodiment, when the number of bids in the bid history that are flagged as invalid bids are significant, the threshold value is raised. When a significant number, such as over 30% of the bids in a bid history are flagged as invalid, it may be an indication that the threshold value is set as being too sensitive and capturing or flagging honest bids as being suspicious. To reduce the level of scrutiny, the threshold value may be adjusted upward. A significant number is represented as a number that is abnormal when considered against the population of bids in a bid history. In some cases, a significant number of invalid bids may be as small as one percentage of all of the bids in the bid history, whereas in other cases a significant number of invalid bids may be several percent, a quarter of the bids, or even more.

In an embodiment, the threshold value is raised or lowered as a function of the number of bids in the bid history are flagged as invalid bids. Consider, when there are a larger number of bids flagged as being invalid, one explanation is that there is more suspicious bidding activity; however, another explanation is that the threshold value is too sensitive. By raising or lowering the threshold value, a balance may be found between trapping suspicious activity and inconveniencing honest users who may bid in abnormal patterns.

Figure 5:
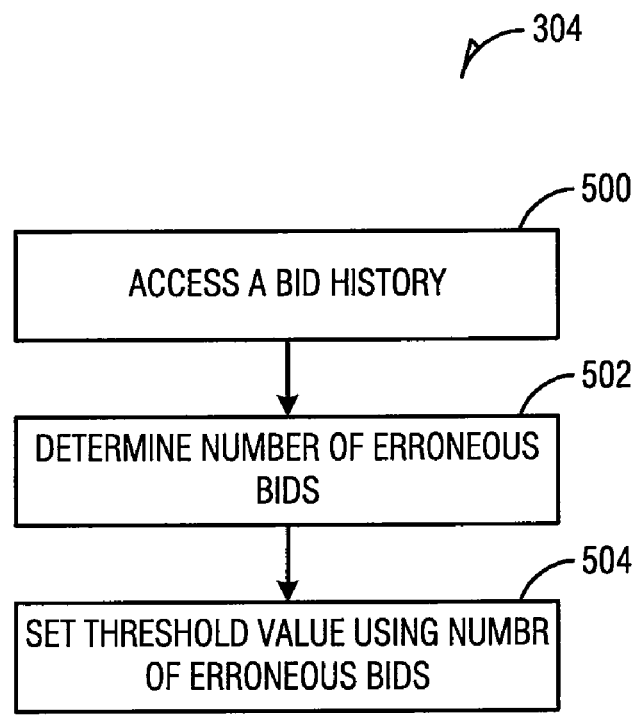
FIG. 5 is a flowchart illustrating a method of determining a threshold value, according to an example embodiment.

Referring now to FIG. 5, the figure depicts a flow chart illustrating a method 304 of determining a threshold value, according to an example embodiment. At 500 a bid history is accessed. Bid histories may be aggregated, combined, filtered, or otherwise collected into groups, such as a user bidding history, an item bid history, or a system-wide bid history.

The user bid history is one or more users' history of bidding within the auction system. Accessing a user bidding history may be useful to determine whether a particular user has a propensity to make errors when bidding. Also, a user bidding history may give indications of attempts of defrauding, or "gaming", one or more auctions to gain an unfair advantage. It may be possible to determine bidding patterns, which may then be used to configure the threshold value. For example, a bidder who routinely bids ten times higher than the current bid may be granted greater deference through the use of a higher (e.g., more relaxed) threshold value. In contrast, a bidder who has never bid more than twice the amount of the current bid may be constrained with the use of a lower threshold condition.

A category bid history is bid histories of items in a particular category or bid histories of a category as a whole. A category is recognized as a collection of items sharing a common attribute. For example, one product category may be "Cameras." A subset of the "Camera" category, may be "Nikon Cameras." The "Nikon Cameras" subset is also considered a category. Taken together, the "Cameras" and "Nikon Cameras" categories create a category hierarchy. Category bid histories may be derived using a hierarchy. Using a category bid history, an expected range of bids may be determined and an expected final bid amount, with some degree of uncertainty or range of values, may be calculated.

An item bid history or the bid histories of a group of items may be useful to determine whether the proposed bid is potentially erroneous in view of prior bids. An analysis may determine whether the proposed bid fits reasonably within a pattern set by prior bids or whether there is an abnormal deviation in the proposed bid. Users and items may be grouped together, such as by product categories or user likenesses, to perform pattern matching amongst similar comparables in order to determine abnormal deviations.

A system bid history includes bids recorded at one or more auction systems. A system bid history is an accumulation of bid histories of items on the auction site. This information may be useful when determining trends in system-wide data entry errors. A system-wide bid history may be useful to determine trends in data entry errors, for example a likelihood of errors in relation to the time of day or a propensity of bidding error from a particular country or geographical region. As an illustration, a bid history of the system for the previous 24 hours may indicate that error rates increase between the hours of 10:00 PM and 6:00 AM, leading to the inference that people are less alert at those times. The threshold condition may be configured taking this pattern of data entry errors into account.

At 502, a number of instances is determined, where each instance is an erroneous bid less than the threshold value. In an embodiment, a bid is considered erroneous when it has been retracted or a request has been made to retract the bid during an auction. As such, an erroneous bid is a bid that a user made in error—as evidenced by the retraction request or actual retraction.

At 504, the threshold value is set using the number of instances. For example, the threshold value may be derived from a function of the number of instances of erroneous bids, such that where there is a greater number of erroneous bids, then the threshold value may be decreased, thereby capturing more bid entries and flagging them as potentially invalid. In an example embodiment, after being flagged as potentially invalid, the bidder may have the opportunity to confirm the bid as being correct, in which case the bid is flagged as being valid. This two-step process may reduce the number of bid retracts and consequently reduce the number of erroneous bids. Conversely, when the number the erroneous bids is fewer, the threshold value may be increased to allow more bids to pass through the threshold evaluation without a confirmation step.

In an example embodiment, a determination is made as to whether or not the number of instances of erroneous bids is less than a lower threshold, where each bid is less than or equal to the threshold value. The lower threshold may be configurable. For example, a system administrator may provide a percentage, such as 3%, such that when the number of instances of erroneous bids is less than 3% of the total number of bids over a period of time, then the number of erroneous bids is under the lower threshold. Other metrics may be used to determine whether a number of erroneous bids are relatively low or relatively high, such as a fixed number of bids, a percentile, or other statistical operations.

The threshold value may then be increased. The amount of the increase may be configurable or fixed. The increase may be a function of the number of instances of erroneous bids. For example, the threshold value may be increased to the point where the number of erroneous bids under the newly raised threshold value is equal to the percentage provided to determine the lower threshold standard. This is analogous to saying that the threshold value has been relaxed to allow more bids to pass through it without being further analyzed and potentially rejected.

A determination may be made as to whether or not the number of instances of erroneous bids exceed an upper threshold, where each bid is less than or equal to the threshold value. Again, as described above, the upper threshold may be a statistical standard based on a percentage, fixed value, or other statistical function. In this case, the threshold value is decreased. While decreasing the threshold value may have the effect of increasing the burden on the bidders, it may also reduce the number of erroneous bids that are allowed to be processed without further scrutiny.

Figure 6:
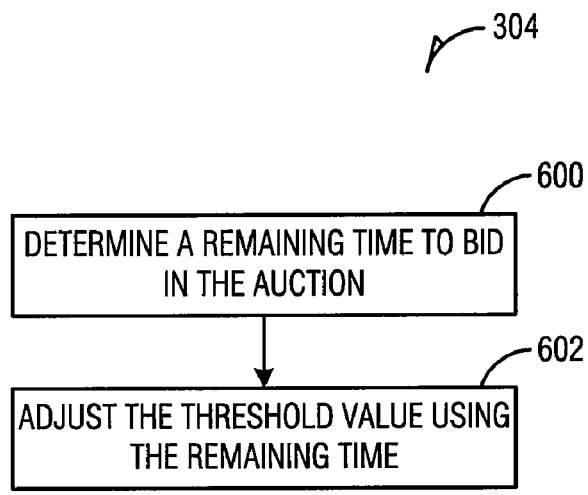
FIG. 6 is a flowchart illustrating a method of determining a threshold value, according to an example embodiment.

Referring now to FIG. 6, the figure depicts a flow chart illustrating a method 304 of determining a threshold value, according to an example embodiment. At 600 a remaining time to bid on the auction item is determined. In an embodiment, the time remaining may be determined by a programmatic call to the API server 114 or a database server 124 (FIG. 1).

At 602, the threshold value is adjusted using the remaining time. In an example embodiment, the threshold condition may be adjusted using a function of the current bid, the proposed bid, and the time remaining. For example, the function may relax the threshold condition as the auction approaches its end. As an example, with ten minutes remaining in the auction, a current bid of $10, and a proposed bid of $15, the threshold value may be set to $14. Using this threshold value, additional validation is performed on the proposed bid amount. With only five minutes left in the auction, the threshold value might be set to $16, in which case the system would automatically allow the bid without additional validation. By dynamically adjusting the threshold value, the system may reduce delays by not having to verify incrementally larger bids at the expense of having to accommodate for more typographical errors as people attempt to get bids in before the auction expires.

Referring again to FIG. 3, at 306, the proposed bid compared to the threshold value to determine if the proposed bid is greater than the threshold value.

When the proposed bid is greater than the threshold value, at 308, the proposed bid is validated using the current bid in combination with the proposed bid to obtain a validation result. Several embodiments are described in the following description of FIGS. 7-9.

Figure 7:
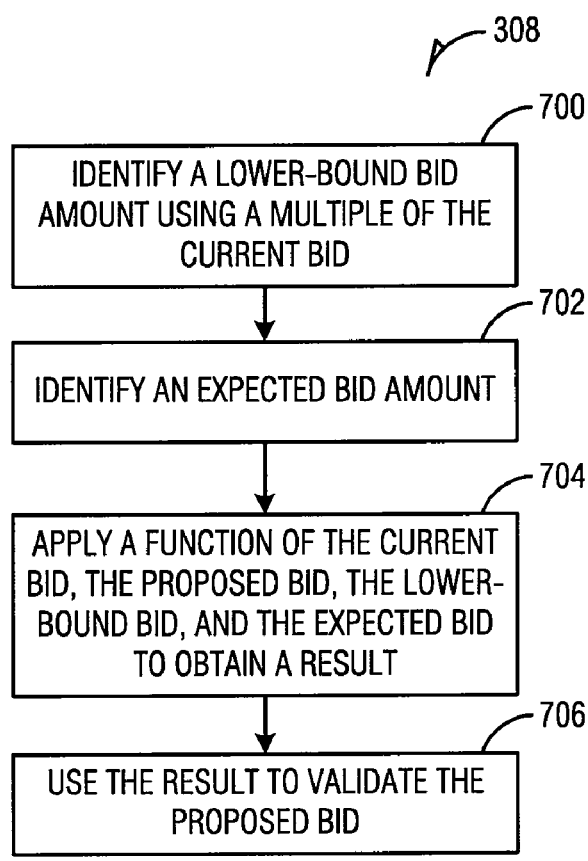
FIG. 7 is a flowchart illustrating a method of validating a current bid, according to an example embodiment.

FIG. 7 is a flowchart illustrating a method 308 of validating a current bid, according to an example embodiment. At 700, a lower-bound bid amount is identified using a multiple of the current bid. A lower-bound bid amount represents an approximate minimum bid amount that a bidder would be expected bid for an auction item given the current auction environment. There are various ways to determine the lower-bound bid amount. In an example embodiment, the lower-bound bid amount is determined as a multiple of the current auction price. In an example embodiment, the lower-bound bid amount is determined as a multiple of the starting auction price. In an example embodiment, the lower-bound bid amount may be determined by accessing a bid history of similar items, computing an expected winning bid, and setting the minimum threshold bid at a percentage of the expected highest bid (e.g., 15%). In another example embodiment, the lower-bound bid amount is set at a fixed amount over the starting auction price. For example, the lower-bound bid amount may be set at $5.00 over the starting auction price, whatever that may be.

At 702, an expected bid amount is identified. The expected bid amount is an approximation of the highest bid a bidder would be expected to bid for an auction item given the current auction environment. Bids that are submitted that exceed the expected bid amount may be more likely to be erroneous or invalid. The expected bid amount may be determined in a number of ways. In an embodiment, one or more third party sites may be accessed to determine an expected bid amount (e.g., sites that offer Manufacturer Suggested Retail Price or a market price). In another embodiment, the expected bid amount may be determined by accessing a bid history to calculate a probable final bid amount. The expected bid may also be calculated by some other statistical function based on a set of winning bid prices, such as median, minimum, or maximum, in various embodiments.

At 704, a function of the current bid, the proposed bid, the lower-bound bid, and the expected bid is applied to obtain a result. The variables of the current bid, the proposed bid, the minimum threshold amount, and the maximum expected bid amount may be accorded different weights in the function. The function of the current bid, proposed bid, lower-bound bid, and expected bid may be illustrated as follows, according to an example embodiment, result=EVAL (proposed_bid>lower-bound_bid AND proposed_bid> (K*current_bid) AND proposed_bid>expected_bid+B), where K is a value used to provide a multiple of the current_bid value and B is a value used to provide a valid upper limit to the expected bid value. The value K may be an integer or real value, in various embodiments. The function EVAL( ) evaluates the logical conditional statement.

At 706, the result is used to validate the proposed bid. In the example illustrated, when the result evaluates to TRUE, then a bid is considered invalid. For example, a bid that exceeds the lower-bound bid and a multiple of the current bid may be considered excessive. The additional fact that the bid also exceeds an expected bid by more than the value B indicates that the proposed bid may be an erroneous input, such as entering "$10000" instead of "100.00".

Figure 8:
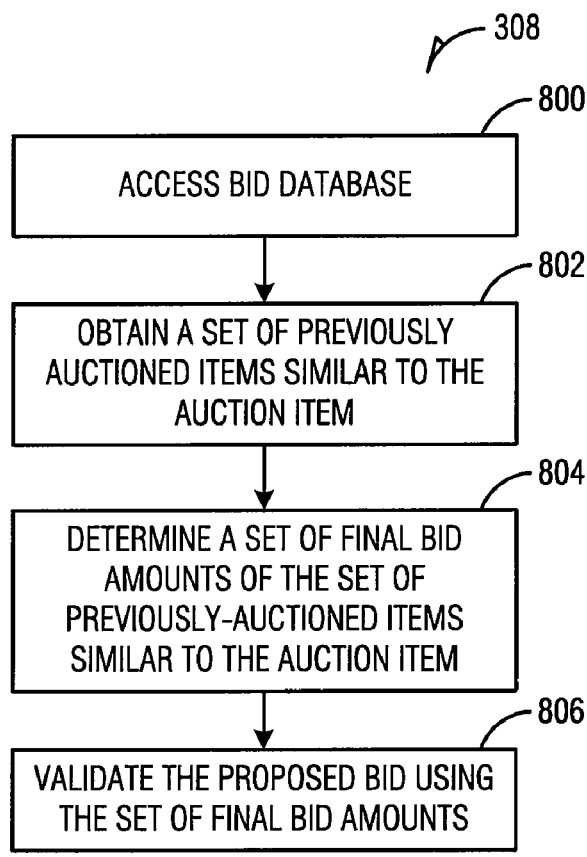
FIG. 8 is a flowchart illustrating a method of validating a current bid, according to an example embodiment.

FIG. 8 is a flowchart illustrating a method 308 of validating a current bid, according to an example embodiment. At 800, a bid database is accessed. As described above, the bid database may be accessed in various ways and the bid history data may comprise various views, subsets, or collections of historical bid data.

At 802, a set of previously auctioned items similar to the auction item is obtained. Similarity may be based on a product type, a product category, a service type, a service category, an auction date, an auction type, or other categorizations or attributes of an auctioned item. For example, two bicycles auctioned using a standard auction type less then four months apart may be considered similar auction items; whereas two bicycles, where one was auctioned using a standard auction type and the other was auctioned using a Dutch auction may not be considered similar auction items for the purposes of this analysis.

At 804, a set of final bid amounts of the set of previously-auctioned items similar to the auction item is determined. The set of final bid amounts may include all final bid amounts for the previously-auctioned items or the set may be a subset of the final bid amounts. Various statistical operations may be used to condition the data. For example, a normal distribution may be constructed and a percentage of outliers may be eliminated. Other statistical distributions may be used, such as T-distribution, Lévy skew alpha-stable distribution, or hyperbolic distribution. Other approaches may be taken as well, such as using a randomly selected group of the final bid amounts from the entire set. Another embodiment may limit the selection of final bid amounts to those transactions that have occurred in some time span (e.g., bids received in the last 3 months).

At 806, the proposed bid is validated using the set of final bid amounts. In an embodiment, a proposed bid is validated by comparing the proposed bid to the average of the set of final bid amount. If the proposed bid deviates significantly from the average, then the bid may be considered an invalid bid. In such embodiment, the validation is used as a data consistency check or "sanity check." Additional embodiments may use a statistical function other than the average, such as the mode, median, maximum, or minimum values of the set of final bid amounts.

Figure 9:
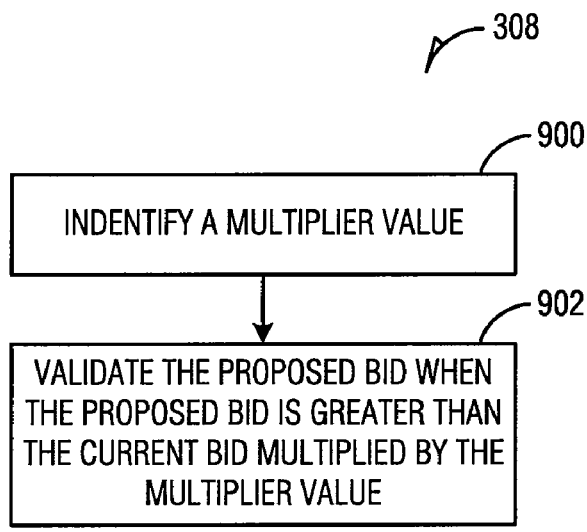
FIG. 9 is a flowchart illustrating a method of validating a current bid, according to an example embodiment.

FIG. 9 is a flowchart illustrating a method 308 of validating a current bid, according to an example embodiment. At 900, a multiplier value is identified. The multiplier value may be a fixed value or a calculated value, in various embodiments. For example, a system administrator may set the multiplier value as 100 times the current value. As another example, a system administrator may set the multiplier value as $500.00, or an equivalent in foreign currency. In addition, the multiplier value may be a dynamically adjustable value. For example, the multiplier value may change according to a product category, a user, a catalog, a storefront, or based on other aspects of an online auction system.

At 902, the proposed bid is validated when the proposed bid is greater than the current bid multiplied by the multiplier value. Simply put, the proposed bid is not further validated when the proposed bid is between the threshold value and the current bid multiplied by the multiplier value. However, when the proposed bid exceeds the current bid multiplied by the multiplier value, then the proposed bid is considered abnormally high and therefore suspicious. In this situation, the proposed bid is further analyzed by the validation operation.

As an illustration of method 308 as described with respect to FIG. 9, consider an auction for an auction item that has a beginning auction price of $0.01 and a current price of $2.49. Also, suppose that the threshold value is established at $1.00 and the validation operation is "Bid placed is more than 90 times the current value." In a first scenario, when a bidder enters a proposed bid of $15.00, then the method 300 (FIG. 3) evaluates whether the current price is greater than the threshold value, which it is, and then evaluates whether the proposed bid is greater than 90 times the current value (e.g., the validation), which it is not. Thus, because the proposed bid is less than 90 times the current value, the validation process provides a result indicating that the bid is valid and the bid is accepted.

In another scenario, the bidder enters a proposed bid of $1500.00 (misplacing the decimal point). In this case, the proposed bid does satisfy the validation operation (1500>90*2.49) and as such, a warning will be provided. Should the bidder actually want to bid $1500.00 on an item with a current price of $2.49, then after confirming the bid as being accurate, the bid is accepted. However, in some cases, after confirming the bid, the bidder may be restricted from withdrawing or retracting the bid.

The two-phase check will allow bids to be entered freely until the current price reaches the threshold value, after which the proposed bids are validated. As described above, the threshold value and the validation operation may be adapted, modified, dynamically adjusted, or otherwise revised based on bidding histories, current prices, or auction attributes (e.g., remaining time or type of auction). Although the embodiments described herein refer to the threshold value or the threshold condition in particular, it is understood that either the threshold value or the validation operation may be adjusted using mechanisms described for either.

Figure 10:
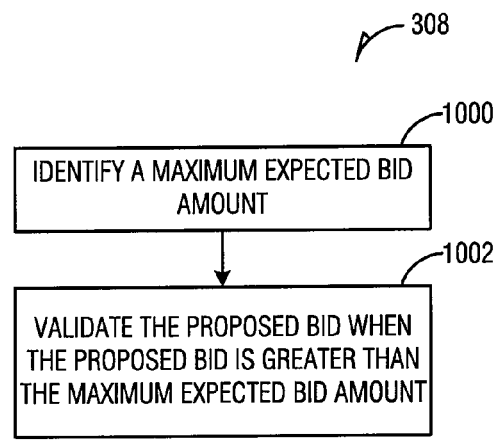
FIG. 10 is a flowchart illustrating a method of validating a current bid, according to an example embodiment.

FIG. 10 is a flowchart illustrating a method 308 of validating a current bid, according to an example embodiment. At 1000, a maximum expected bid amount is identified. The maximum expected bid amount is an approximate of the highest bid a bidder would be expected to bid for an auction item in a given market. In an embodiment, the maximum expected bid amount may be determined by accessing a set of bid histories of similar items to calculate an average winning bid amount. In another embodiment, the maximum expected bid amount may be calculated by some other statistical function on a set of winning bid prices, such as median, minimum, or maximum. In another example embodiment, the maximum expected bid amount may be calculated by adding a fixed value or a percentage to a value obtained from the bid histories. For example, a maximum expected bid amount may be set to 10% over the highest winning bid in the last six months for items similar to the item being auctioned. This configuration allows for some normal variance that may be observed in an auction system or in a market.

At 1002, the proposed bid is validated when the proposed bid is greater than the maximum expected bid amount. As with the multiplier value described in FIG. 9, the maximum expected bid amount acts as a second condition before a validation operation is conducted.

In an example embodiment, a warning is presented when the proposed bid is greater than the threshold value and the validation indicates that the proposed bid is potentially invalid or erroneous. In an example embodiment, an error is generated and the proposed bid is rejected.

A confirmation of the proposed bid may be requested. The bidder is given the opportunity to confirm that the entered bid was the amount intended. The confirmation option may, in some embodiments, be presented in a bid confirmation user interface, which may include a user input control (e.g., a button, hyperlink, text entry field, radio box, checkbox, or other user interface control) to indicate whether the bidder affirms the entry is correct.

The confirmation decision is evaluated and if the bidder confirms that the proposed bid is a correct entry, then the system accepts the proposed bid. Confirming a bid that was suspected to be erroneous or malicious may have additional conditions imposed by the auction service provider or seller. In an example embodiment, a bidder who confirms a bid that has failed the validation may be prohibited from later retracting the bid.

Should the bidder chose to reject the bid, the bid is rejected and the bid is not used to increment the bidding on the auction item and may not be recorded in the bid history of the auction item. In an example embodiment, the bid is recorded for administrative use, for example to track bidding histories of suspected malicious bidders.

In another example embodiment, one or more bid histories may be accessed to derive the number of false positives, true positives, false negatives, or true negatives of invalid bids.

For example, the number of valid bids may be determined, where each bid fails to satisfy the threshold value. These bids represent bids that are false positive—bids that were identified as being invalid, but then confirmed as being valid by the bidder. In response to a large number of false positive bids in the bidding history, the threshold value may be adjusted or the validation process may be tuned.

Similarly, a bid history may be analyzed to determine a number of true positives (an invalid bid that was confirmed as being invalid), true negatives (an incorrectly identified invalid bid), and false negatives (a valid bid that was not identified as being invalid) that are present in the bid history. For example, by analyzing bid retractions, a bid that failed a threshold value and was later retracted may be viewed as a true positive—that is, the bid was eligible to be flagged as a (potentially) erroneous bid and was then retracted, indicating that it was in fact erroneous. Similarly, bids that were eligible to be flagged as (potentially) erroneous but were not retracted may be viewed as false positive cases.

True negative cases may be evidenced by bids that satisfied the threshold condition and were later retracted. Similarly, false negative cases may be evidenced by bids that satisfied the threshold condition and were not retracted.

Adjustments to the threshold value or the validation process may be made to increase the number of true positives and reduce the number of false positives. For example, by raising or relaxing the threshold value, the number of false positives may decrease, but at the expense of potentially decreasing the number of true positives In an example embodiment, the threshold condition is adjusted using a specificity of bids in the bid history. Specificity generally refers to the ability of a mechanism to avoid improper classifications. Specificity may be expressed with the function: specificity=(true negatives)/(true negatives+false positives). Thus, a higher specificity generally reflects more accurate classification of true negatives or reduction of false positives. If the specificity is relatively low, the threshold value or the validation process may be adjusted using data gleaned from the set of false positives. The adjustment may be to relax the threshold value or the validation process so that more bids are considered valid. In another embodiment, the threshold value or the validation process may be tailored to specific patterns isolated in the set of false positives (e.g., auctions in their first 24 hours having a high number of false positives from high ratios between the first and second bids).

In addition, the threshold value or the validation process may be adjusted using a sensitivity of the bids in the bid history. Sensitivity generally refers to the ability of the detection scheme to effectively detect a particular result. Sensitivity may be expressed with the formula: sensitivity=(true positives)/(true positives+false negatives). Thus, a higher sensitivity generally indicates that an analysis correctly characterizes more true positives or eliminates false negatives. If the sensitivity is relatively low, the threshold value or the validation process may be adjusted using data gleaned from the set of false negatives. The adjustment may constrict the threshold value or the validation process so that more bids are treated as erroneous.

FIG. 11 is a block diagram showing a computer system 1100, according to an example embodiment. A receiving module 1102 receives a proposed auction bid. The proposed auction bid is representative of a value a bidder is willing to bid for an auctioned item. The proposed bid may be entered by a human user, such as by using a client machine 110 via a web client 106 (FIG. 1). The proposed bid may alternatively be entered by an automated system, for example, implemented on a client machine 112 using a programmatic client 108 or on a third party server 130 using a third party application 128 (FIG. 1).

A threshold value determination module 1104 determines a threshold value. In an example embodiment, the threshold value may be a fixed value (e.g., $5.00). In another example embodiment, the threshold value is a variable value. A variable threshold value may be determined in various ways, such as by using a ratio of the current high bid (e.g., 5:1) or the current high bid plus some fixed currency value. For example, when the current high bid is $8.00, using a ratio of 5:1, the threshold value would be set to $40.00. Thus, when a proposed bid is at least $40.00, additional processing is performed to detect whether the bid may be erroneous. In another example, using the current high bid plus a fixed value of $10.00, the threshold value is computed to be $18.00. Again, a proposed bid over the amount of $18.00 would trigger additional processing. Other examples of determining a threshold value are described above with reference to FIGS. 3-6.

A comparison module 1106 compares the proposed bid to the threshold value to determine if the proposed bid is greater than the threshold value.

If the proposed bid is determined to be at least the threshold value by the comparison module 1106, then a validation module 1108 validates the proposed bid. In an example embodiment, the validation is expressed with a comparison operator and a value, to which the proposed bid is compared. For example, the validation may be expressed as a query, such as "Is the proposed bid greater than $500.00?" The validation may be a calculated value, such as "90*current bid." In an example embodiment, the validation is expressed as a logical rule, which may include several comparisons or other logical functions. For example, the threshold condition may be "Is the proposed bid over 100 times the current bid AND from a user with a history of five or more bids with values of over 100 times the current bid?" In this example, a user with a history of excessively high proposed bids may have the current proposed bid flagged as being potentially erroneous or problematic when the current proposed bid is over 100 times the current bid value.

An acceptance module 1108 accepts the proposed bid when the validation module 1106 has established that the bid is valid. The acceptance module 1108 may be configured to communicate the valid bid to other portions of the networked system 102, such as the marketplace applications 120, for further processing. For example, when the proposed bid is accepted, the bid is entered into an auction system and represented in the auction listing as the current bid price. Additionally, other processes may occur, such as notification to the buyer, seller, or other bidders of the new bid price.

A warning module 1110 is configured to generate an error when either the proposed bid fails the conditional evaluation performed by the validation module 1106 or fails to be accepted by the acceptance module 1108. In an embodiment, when an error is generated the proposed bid is rejected. The error may be displayed to the bidder. The error may be logged or otherwise recorded for administrative purposes, historical statistical use, or for the user's own reference.

Machine Architecture

FIG. 12 is a block diagram illustrating a machine in the example form of a computer system 1200, within which a set or sequence of instructions for causing the machine to perform any one of the methodologies discussed herein may be executed, according to various embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1526 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, optical and magnetic media.

Certain systems, apparatus or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine readable medium bearing instructions that when executed by one or more processors, performs that portion of the functionality implemented in software or firmware. The modules may be regarded as being communicatively coupled to one another to at least the degree needed to implement the described functionalities.

Thus, a method and system to detect bidding errors have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one non-transitory machine-readable storage medium; and
   one or more processors, the one or more processors communicatively coupled to the at least one machine-readable storage medium, the at least one machine-readable storage medium including instructions, which when executed by the one or more processors, cause the one or more processors to:
   receive a proposed bid for an auction item, the auction item having a current bid and a minimum bid increment, the proposed bid being greater than the sum of the current bid and the minimum bid increment;
   determining a threshold value by using, a bid history of an item similar to the auction item, the threshold value raised and lowered as a function of the number of bids in the bid history, that are flagged as invalid bids, the threshold value being greater than the sum of the current bid and a minimum bid increment; and
   responsive to the proposed bid exceeding the threshold value, validating the proposed bid using the current bid and the proposed bid to obtain a validation result.

2. The system of claim 1, wherein the at least one machine-readable medium includes instructions, which when executed by the one or more processors, cause the one or more processors to:
   request confirmation of the proposed bid when the validation result indicates that the proposed bid is invalid; and
   mark the proposed bid as valid if the proposed bid is confirmed.

3. The system of claim 1, wherein the instructions to determine the threshold value further comprise instructions to raise the threshold value when a significant number of bids in the bid history are flagged as invalid bids.

4. The system of claim 1, wherein the instructions to validate the proposed bid further comprise instructions to:
   identify a lower-bound bid amount using a multiple of the current bid;
   identify an expected bid amount;
   apply a function of the current bid, the proposed bid, the lower-bound bid amount, and the expected bid amount to obtain a result; and
   validate the proposed bid using the result.

5. A method of processing an auction bid, comprising:
   using one or more computer processors programmed to:
   receive a proposed bid for an auction item, the auction item having a current bid and a minimum bid increment, the proposed bid being greater than the sum of the current bid and the minimum bid increment;
   determine a threshold value by using a bid history of an item similar to the auction item, the threshold value raised and lowered as a function of the number of bids in the bid history that are flagged as invalid bids, the threshold value being greater than the sum of the current bid and a minimum bid increment; and
   responsive to the proposed bid is exceeding the threshold value, validating the proposed bid using the current bid and the proposed bid to obtain a validation result.

6. The method of claim 5, wherein the one or more computer processors are further programmed to generate a response when the validation result indicates that the proposed bid is invalid.

7. The method of claim 6, wherein the act of generating the response further comprises the act of presenting a warning.

8. The method of claim 6, wherein the act of generating the response further comprises the act of requesting confirmation of the proposed bid, and when the proposed bid is confirmed, accepting the proposed bid.

9. The method of claim 5, wherein the bid history comprises one or more of: a user hid history, a category bid history, or a system-wide bid history.

10. The method of claim 5, wherein the act of determining the threshold value further comprises the acts of:
    determining a remaining time to bid on the auction item; and
    adjusting the threshold value using the remaining time.

11. The method of claim 5, wherein the act of validating the proposed bid further comprises the acts of:
    accessing a bid database;
    obtaining a set of previously-auctioned items similar to the auction item;
    determining a set of final bid amounts of the set of previously-auctioned items similar to the auction item; and
    validating the proposed bid using the set of final bid amounts.

12. The method of claim 11, wherein the act of validating the proposed bid using the set of final bid amounts further comprises the act of validating the proposed bid using the average of the set of final bid amounts.

13. The method of claim 5, wherein the act of validating the proposed bid further comprises the acts of:
    identifying a multiplier value; and
    validating the proposed bid when the proposed bid is greater than the current bid multiplied by the multiplier value.

14. The method of claim 5, wherein the act of validating the proposed bid further comprises the acts of:
    identifying a maximum expected bid amount; and
    validating the proposed bid when the proposed bid is greater than the maximum expected bid amount.

15. A non-transitory computer-readable storage medium including instructions, which when executed on one or more computers, cause the one or more computers to:
    receive a proposed bid for an auction item, the auction item having a current bid and a minimum bid increment, the proposed bid being greater than the sum of the current bid and the minimum bid increment;
    determine a threshold value by using a bid history of an item similar to the auction item, the threshold value raised and lowered as a function of the number of bids in the bid history that are flagged as invalid bids, the threshold value being greater than the sum of the current bid and a minimum bid increment;
    responsive to the proposed bid is exceeding the threshold value, validate the proposed bid using the current bid and the proposed bid to obtain a result; and
    store the validation result of the proposed bid in non-volatile computer memory.

16. The computer-readable storage medium of claim 15, further comprising instructions, which when executed on the one or more computers, cause the one or more computers to: generate a warning response when the validation result indicates that the proposed bid is invalid.

17. The computer-readable storage medium of claim 16, further comprising instructions, which when executed on the one or more computers, cause the one or more computers to request confirmation of the proposed bid, and when the proposed bid is confirmed, validate the proposed bid and mark the proposed bid as being un-retractable.

* * * * *

UNITED STATES PATENT AND TRADEMARK OFFICE
CERTIFICATE OF CORRECTION

| | | |
|---|---|---|
| PATENT NO. | : 7,953,647 B2 | |
| APPLICATION NO. | : 12/503745 | |
| DATED | : May 31, 2011 | |
| INVENTOR(S) | : Alvaro Bolivar et al. | |

It is certified that error appears in the above-identified patent and that said Letters Patent is hereby corrected as shown below:

IN THE DRAWINGS

On Sheet 2 of 8, Reference numeral 212, Figure 2, line 1, delete "INTERNATIONLIATION" and insert -- INTERNATIONLIZATION --, therefor.

IN THE DRAWINGS

On Sheet 4 of 8, Reference numeral 504, Figure 5, line 1, delete "NUMBR" and insert -- NUMBER --, therefor.

In column 11, line 40, delete "then" and insert -- than --, therefor.

In column 14, line 8, after "positives" insert -- . --.

In column 17, line 59, in Claim 5, after "bid" delete "is".

In column 18, line 50, in Claim 15, after "bid" delete "is".

Signed and Sealed this
Ninth Day of August, 2011

David J. Kappos
*Director of the United States Patent and Trademark Office*